United States Patent
Tecu

(10) Patent No.: US 9,798,724 B2
(45) Date of Patent: Oct. 24, 2017

(54) DOCUMENT DISCOVERY STRATEGY TO FIND ORIGINAL ELECTRONIC FILE FROM HARDCOPY VERSION

(71) Applicant: Konica Minolta Laboratory U.S.A., Inc., San Mateo, CA (US)

(72) Inventor: Kirk Steven Tecu, Longmont, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 251 days.

(21) Appl. No.: 14/588,194

(22) Filed: Dec. 31, 2014

(65) Prior Publication Data

US 2016/0188580 A1 Jun. 30, 2016

(51) Int. Cl.
 *G06F 17/30* (2006.01)
 *G06K 9/00* (2006.01)
 *G06K 9/20* (2006.01)

(52) U.S. Cl.
 CPC .. *G06F 17/30011* (2013.01); *G06F 17/30247* (2013.01); *G06K 9/00483* (2013.01); *G06K 9/2063* (2013.01)

(58) Field of Classification Search
 USPC .............. 707/706, 821, 758, 760; 358/1.18; 382/176, 173
 See application file for complete search history.

(56) References Cited

U.S. PATENT DOCUMENTS

| | | | |
|---|---|---|---|
| 6,886,130 B1* | 4/2005 | Unger | G06F 17/30899 707/E17.119 |
| 8,200,669 B1* | 6/2012 | Iampietro | G06F 17/30784 707/737 |
| 8,634,656 B2 | 1/2014 | Yano | |
| 2002/0016800 A1 | 2/2002 | Spivak et al. | |
| 2006/0085442 A1 | 4/2006 | Fujiwara | |
| 2010/0061634 A1* | 3/2010 | Howie | G06F 17/30616 382/176 |
| 2010/0214614 A1* | 8/2010 | Ferlitsch | G06K 15/02 358/1.18 |
| 2013/0007601 A1* | 1/2013 | Grams | G06T 11/60 715/247 |
| 2014/0258258 A1* | 9/2014 | Tecu | G06F 17/30076 707/706 |

FOREIGN PATENT DOCUMENTS

| | | |
|---|---|---|
| JP | 2006-120125 A | 5/2006 |
| JP | 2008-177851 A | 7/2008 |

OTHER PUBLICATIONS

Notification of Refusal issued in corresponding Japanese Application No. 2015-255694 dated Jul. 4, 2017 (10 pages).

* cited by examiner

*Primary Examiner* — Hung T Vy
(74) *Attorney, Agent, or Firm* — Osha Liang LLP

(57) ABSTRACT

A method for document discovery includes receiving a scan of a physical copy of a document with a non-text object, determining a tag for the non-text object defining a portion of the non-text object in an original file, and generating, based on the tag, non-text object metadata with composition information of the non-text object. The method further includes searching, using the non-text object metadata, electronic documents stored in a data repository, where each of the electronic documents has an object and searchable metadata associated with the object, comparing the non-text object metadata with the searchable metadata, and providing a location of the original file to a user when the non-text object metadata matches the searchable metadata.

24 Claims, 4 Drawing Sheets

DOCUMENT DISCOVERY STRATEGY TO FIND ORIGINAL ELECTRONIC FILE FROM HARDCOPY VERSION

BACKGROUND

Electronic document management is a challenging task for organizations large and small. Many thousands of hours and millions of dollars are wasted on efforts searching for misplaced electronic documents and recreating documents when a user is unable to locate the original. In some cases, the user may possess a physical or other non-native copy of the document, but is unable to locate the original electronic document, which may be stored somewhere on a network drive or a data repository, e.g., enterprise content management (ECM) repository. The user may recreate the document, but even with high-quality reconstruction, the reconstructed document may not be identical to the original electronic document.

The user may attempt to find the electronic document by searching the network drive or data repository for strings from the document text. For example, the user may scan the hardcopy and use Optical Character Recognition (OCR) software so that comparisons can be made to find a match in the network drive or EC repository. However, simple text searches may not always be sufficient. For example, if the document lacks text or if the text is not well formed, a search cannot be performed because the OCR software is unable to recognize non-text objects. As another example, if the document contains only very common words, the search may return far too many results.

SUMMARY

In general, in one aspect, the invention relates to a method for document discovery, comprising: receiving a scan of a physical copy of a document comprising a non-text object; determining a first tag for the non-text object, wherein the first tag defines a portion of the non-text object in an original file; generating, based on the first tag, non-text object metadata comprising composition information for the non-text object; searching, using the non-text object metadata, a plurality of electronic documents stored in a data repository, wherein each of the plurality of electronic documents comprises an object and searchable metadata associated with the object; comparing the non-text object metadata with the searchable metadata; and providing a location of the original file to a user when the non-text object metadata matches the searchable metadata.

In general, in one aspect, the invention relates to a system for document discovery, comprising: a data repository storing a plurality of electronic documents, wherein each of the plurality of electronic documents comprise an object and searchable metadata associated with the object; a computer processor; and a document locator executing on the computer processor and configured to: receive a scan of a physical copy of a document comprising a non-text object; determine a first tag for the non-text object, wherein the first tag defines a portion of the non-text object in an original file; generate, based on the first tag, non-text object metadata comprising composition information for the non-text object; search, using the non-text object metadata, the plurality of electronic documents stored in the data repository; compare the non-text object metadata with the searchable metadata; and provide a location of the original file to a user when the non-text object metadata matches the searchable metadata.

In general, in one aspect, the invention relates to a non-transitory computer readable medium comprising instructions for document discovery, the instructions, when executed, are configured to: receive a scan of a physical copy of a document comprising a non-text object; determine a first tag for the non-text object, wherein the first tag defines a portion of the non-text object in an original file; generate, based on the first tag, non-text object metadata comprising composition information for the non-text object; search, using the non-text object metadata, a plurality of electronic documents stored in a data repository, wherein each of the plurality of electronic documents comprises an object and searchable metadata associated with the object; compare the non-text object metadata with the searchable metadata; and provide a location of the original file to a user when the non-text object metadata matches the searchable metadata.

Other aspects of the invention will be apparent from the following description and the appended claims.

DETAILED DESCRIPTION

Figure 1:
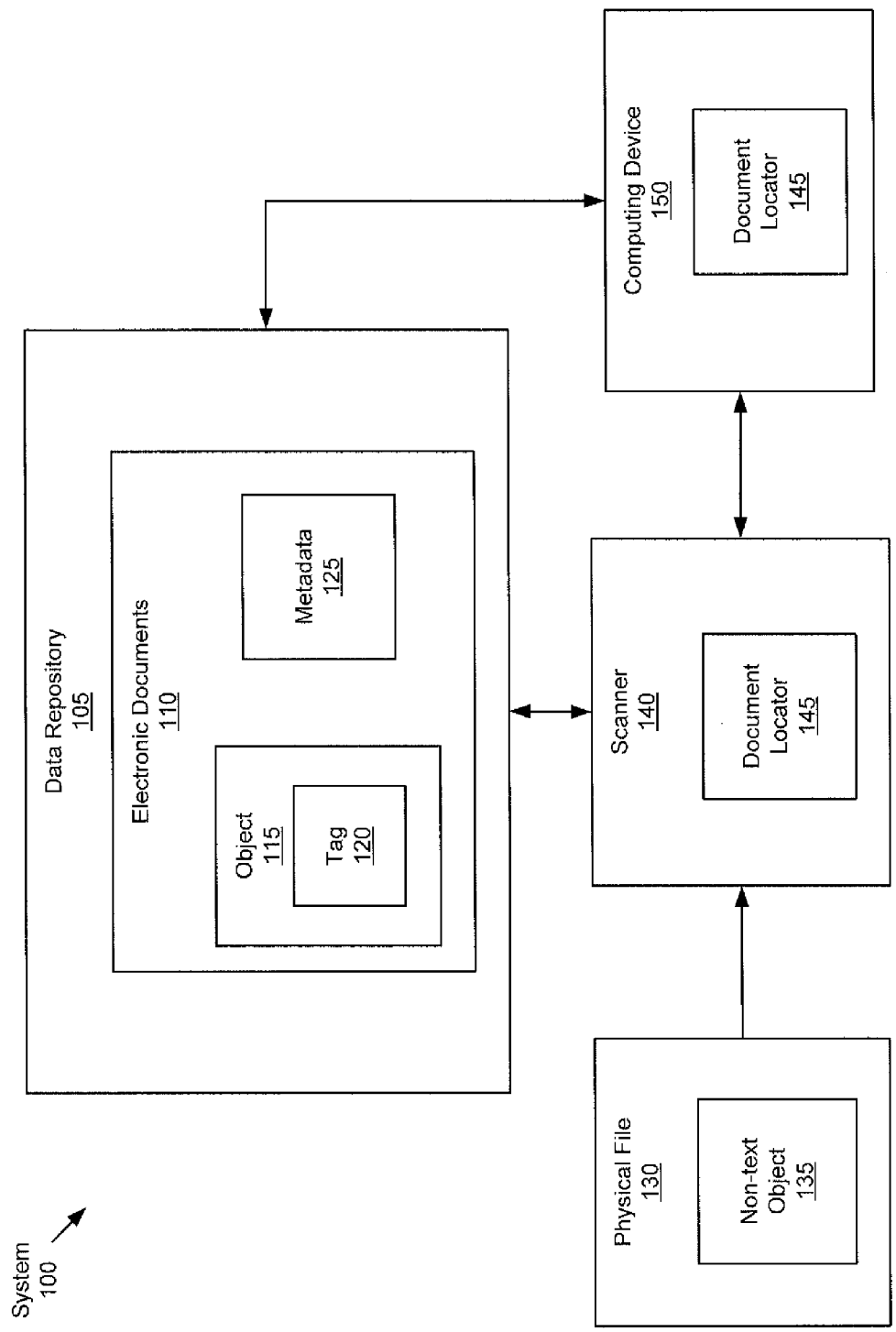
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for document discovery. More specifically, embodiments of the invention enable a user to discover or locate an original electronic document using a copy of the document, e.g., by creating searchable metadata for non-text objects in a non-native copy such as a scanned hardcopy of the electronic document. According to one or more embodiments, for example, the user can use the searchable metadata as part of a text-based query for comparison of terms between the electronic document and the hardcopy that originated from the electronic document. This improves the user's chances of locating the original electronic document for subsequent editing, modification, printing, archiving, etc. Throughout this detailed description, the terms physical copy, hardcopy, paper copy, printout and physical file may be used interchangeably.

In one or more embodiments, a scan of a physical copy of a document including a non-text object is received. One or more tags are determined for the non-text object, and metadata is generated based on the tags. Subsequently, the non-text object metadata is used to search a data repository storing electronic documents to locate the original document. Optionally, existing text strings may be used for searching in addition to the metadata, such as titles, headings, or other content of the electronic document. If found, the location of the original document is provided to the user.

FIG. 1 shows system (100) which includes data repository (105), electronic documents (110), object (115), tag (120), metadata (125), physical copy (130), non-text object (135), scanner (140), document locator (145), and computing device (150). In one or more embodiments, data repository (105) is a memory, a hard drive, a database, a network drive, and/or one or more storage devices located on one or more devices. Data repository (105) may be a component in an enterprise content management (ECM) system. Data repository (105) may be of any size, and may be accessible by any number of users. In one or more embodiments, data repository (105) may have varying levels of user permissions, meaning that some users may have full access to all of the files stored on the data repository, while other users may have access to a limited subset of files. Data repository (105) stores electronic documents (110).

In one or more embodiments, electronic documents (110) are electronic files stored on data repository (105). Electronic documents (110) are used by computing device users to store, share, archive, and search information. Such documents are stored, temporarily or permanently, in files. Many different file formats exist. Each file format defines how the content of the file is encoded. In other words, based on the file format, the content of the file may be read and displayed. Some file formats are used primarily for creating and/or editing documents, while others are primarily for various other uses, e.g., sharing documents with others. Examples of file formats include, e.g., Office Open XML (OOXML), PDF, etc.

Sometimes, users may convert a document of one file format into another file format, such as converting an OOXML document into a PDF document. Additionally, users may print a physical copy of an electronic document. In so doing, aspects of the native file format may be lost. Typically these aspects are invisible to the user, but may have important consequences such as reducing the editing capabilities of the file, or altering the content of the file in other ways. Electronic documents (110) include object (115), tag (120), and metadata (125). Electronic documents (110) may be created by any suitable program, such as word processing programs, note taking programs, spreadsheet programs, slide show programs, etc.

In one or more embodiments, object (115) is text, a graphical image, or any other type of content that is displayable. Graphical images may include bitmap-based images and vector based graphical images. For example, a graphical image may be stylized text (e.g., word art), chart, pictorial image, or other graphics.

In one or more embodiments, object (115) may be delimited by one or more hidden tags (120). Specifically, tag (120) may specify composition information for one or more objects, including formatting and type information. Formatting describes how the object is displayed. Formatting may include color, size, shading, image file name (e.g., puppy.jpg), and other such information. Type refers to what the object is. For example, a type may be a particular kind of chart, word art, text, image, table, clipart, bulleted list, and other such types.

Continuing with tag (120), by way of example, a pie chart object (i.e., an object corresponding to a pie chart) may be delimited from the remainder of the file by a hidden start tag and a hidden end tag that specify pie chart. Within the pie chart object may be tags defining the size of each slice in the pie chart and the color of the slice. A bar graph object may be delimited from the remainder of the original file by a hidden start tag and a hidden end tag that specify bar graph. Text may be delimited by tags specifying font size, font name, font color and other attributes of the text. It will be apparent to one of ordinary skill in the art, having the benefit of this disclosure, that there are many possible tags and, as such, the invention should not be limited to the above examples.

In one or more embodiments, metadata (125) is data stored in the electronic document about the objects within the electronic document. Metadata (125) may be in a searchable text form. Metadata (125) for an object may describe how the object is composed in the file type, such as the type of object and formatting for the object, the location of the object, and/or any other aspects and/or descriptions of the object. For example, the location of each object may be specified by page number of the page in which the object is located and x and y coordinates on the page. In one or more embodiments, the metadata (125) is not used to render the object for display. In other words, the metadata may be used exclusively for informational purposes, such as for searching. The searching may be done, for example, using any text-based search tool, program, and/or method now known or later developed. Alternatively, the searching may be done using a proprietary method or application. In one or more embodiments, the metadata is partially or completely hidden from the user (e.g., invisible text, etc.). In one or more embodiments, metadata (125) is arbitrary and may be defined based on rules created by software developers, users, software publishers, or any other suitable entity. For example, the metadata for a blue square may be defined by a software developer to be "blue, square." A user may optionally modify what metadata is associated with a blue square by adding the term "company logo," for example.

In one or more embodiments, physical copy (130) is a paper copy of an electronic document. Physical copy (130) may be printed out in any manner now known or later developed, and may be printed as closely as possible to how the corresponding electronic document is displayed on a computing device. Alternatively, physical copy (130) may have substantial differences from the way the electronic document is displayed on a computing device. For example, the text font used may not be able to be printed, or the page margins may have to be adjusted. Physical copy (130) may include any of the content of the original electronic document, and in one or more embodiments, includes non-text object (135).

In one or more embodiments, non-text object (135) is a non-text object that is printed on the page(s) of physical copy (130). Non-text object (135) may be of any type as discussed above with regards to object (115). For example, non-text object (135) may be a red circle, a blue triangle, a picture, etc. Although non-text object (135) may include text as a component (such as in columns of a table), non-text object (135) is not simply plain text—there are additional formatting or other aspects present.

In one or more embodiments, scanner (140) is a scanner or other device with scanning functionality, such as a multi-function printer (MFP). Scanner (140) may have many different components including, but not limited to: a processor, memory, displays, inputs, etc. Scanner (140) may include any functionality commonly associated with scanners and/or MFPs such as: optically scanning documents and converting the document to a digital image, performing Optical Character Recognition (OCR), rasterizing images, etc. Scanner (140) may produce documents of many different file types and/or resolutions. Scanner (140) may be communicatively connected to data repository (105) and/or computing device (150) using wired and/or wireless connections, such as the Internet.

In one or more embodiments, scanner (140) includes functionality to execute document locator (145). Document locator (145) is a program or module for locating documents. As shown in FIG. 1, document locator (145) may execute on scanner (140), computing device (150), and/or any other suitable device. Specifically, document locator (145) includes functionality to receive a scan of a physical copy of a document, determine tags for an object, generate metadata, determine permissions, locate electronic documents, and provide the electronic documents to the user.

In one or more embodiments, document locator (145) includes functionality to receive a scan of a physical copy of a document in any format, now known or later developed, and at any resolution. The document locator (145) may receive the scan on the scanner itself, or on a separate computing device. Once the scan is received, document locator (145) includes functionality to determine tags for an object. The object may be identified in the scanned document by the scanner or other computing device, or may be identified by document locator (145) in any manner now known or later developed. Once the objects are identified, document locator (145) analyzes the objects to determine what tags may have been, or were, originally associated with the object when the object was an electronic file. In one or more embodiments, document locator (145) may compare a variety of templates to the objects. Each template may represent one or more tags. If there is a match, or a near match, then the tags associated with that template may be used to objectify the object. In one or more embodiments, document locator (145) may make a best guess as to what tags should be associated with the object. Alternatively, document locator (145) may use any other suitable method to determine what tags should be associated with the object.

In one or more embodiments, document locator (145) includes functionality to generate metadata. The metadata may be generated in any manner now known or later developed. Specifically, the metadata is based on the tags that document locator (145) determines should be associated with the objects, and the metadata describes various aspects of the objects such as size, shape, color, pattern, location, etc. In one or more embodiments, the metadata is in text form so that existing search functionalities may be used to quickly locate electronic copies of documents.

In one or more embodiments, document locator (145) includes functionality to locate electronic documents. The electronic documents may be located in any manner now known or later developed. For example, a text-based search is used to locate the electronic documents. The text used in the search is parts, or all, of the metadata about the objects. Optionally, the text used in the search may also include standard text existing within the electronic document. Assuming that the electronic documents being searched have been pre-processed to include metadata about objects, this text-based search is able to return a subset of electronic documents that may match a given physical copy even when there is little to no real text in the document. In other words, by using the metadata as search terms, document locator (145) is effectively able to locate electronic documents based on the objects located within them (such as a blue, green, and red pie chart in the middle of page 3), rather than text that may frequently appear in many different documents.

In one or more embodiments, document locator (145) includes functionality to determine permissions. Permissions may control who may view, modify, and/or access electronic documents. If a user possesses a paper copy of a document, that does not necessarily mean that the user is authorized to have access to the electronic version of the file. Thus, document locator (145) may determine the permissions of the user to ensure that they are authorized to access the file before document locator (145) informs the user where the electronic copy of the document resides. In one or more embodiments, document locator (145) may require the user to login, provide a password, or otherwise indicate who they are, so that their permissions may be determined. Alternatively, document locator (145) may determine and check permissions in any other suitable manner.

In one or more embodiments, document locator (145) includes functionality to provide the located electronic documents to the user. The located electronic document(s) may be provided to the user in a variety of ways. In one or more embodiments, the located electronic document(s) may be e-mailed to the user. Alternatively, a file name and/or location may be displayed on the scanner, printed out, or e-mailed to the user. It will be apparent to one of ordinary skill in the art, having the benefit of this disclosure, that there are many ways to provide the located documents to the user and, as such, the invention should not be limited to the above examples.

In one or more embodiments, computing device (150) may be any type of device capable of creating electronic files, such as a desktop computer, laptop computer, smartphone, tablet, etc. Computing device (150) may include many different components, such as a processor, memory, input devices, etc. (not shown). In one or more embodiments, computing device (150) may execute various programs/applications (not shown) that a user may utilize to create electronic documents. These programs/applications may be, for example, word processing programs, slide show programs, spreadsheet applications, note taking applications, etc. In one or more embodiments, computing device (150) may store, modify, or otherwise access electronic documents stored on data repository (105). Additionally, computing device (150) may execute document locator (145), as discussed above.

Figure 2:
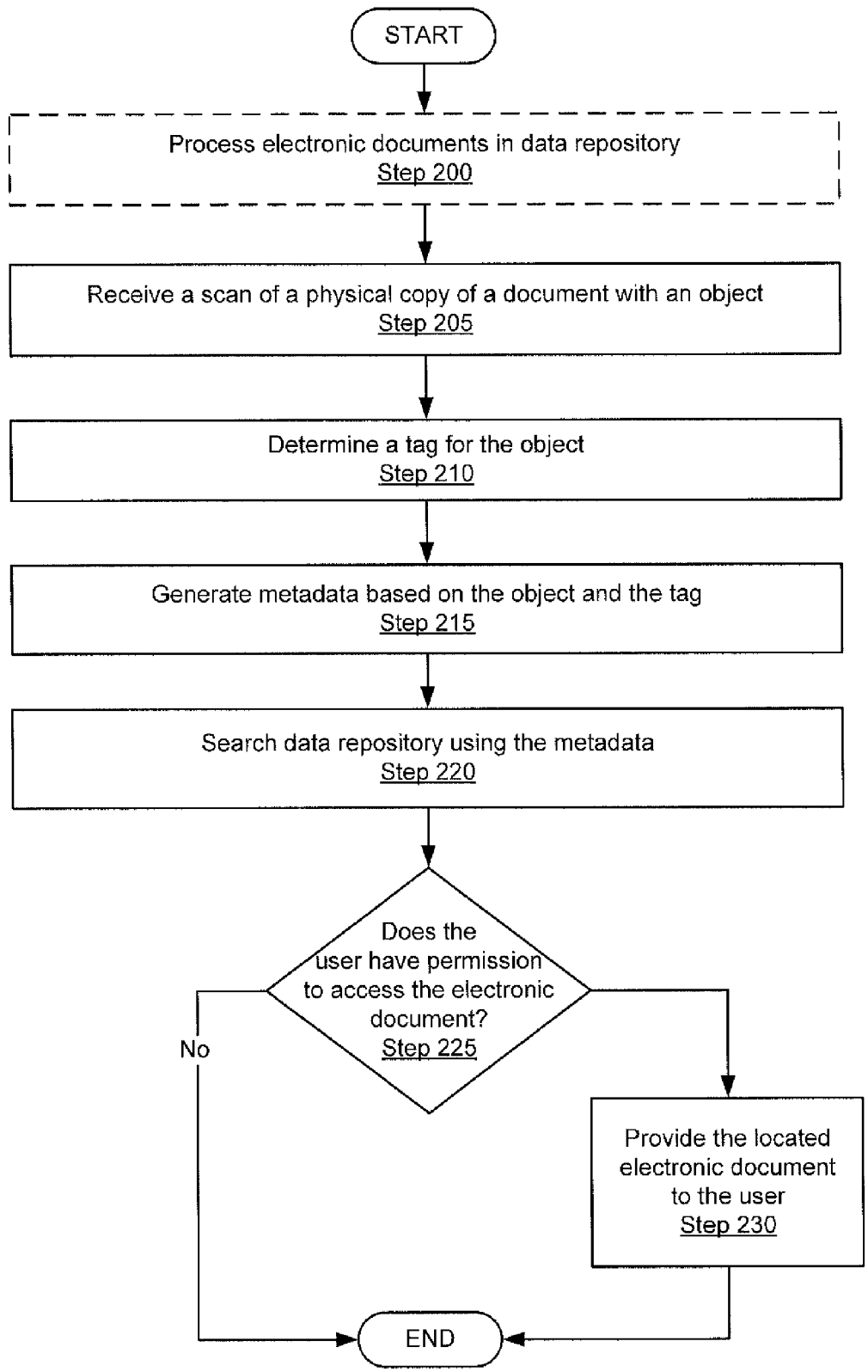
FIG. 2 shows a flowchart in accordance with one or more embodiments of the invention.

FIG. 2 shows a flowchart in accordance with one or more embodiments of the invention. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Further still, additional steps not shown may also be performed without deviating from the scope of the invention. Accordingly, the specific arrangement of steps shown in FIG. 2 should not be construed as limiting the scope of the invention.

In Step 200, electronic documents in a data repository are processed to include metadata about objects within the electronic documents. As indicated by the dotted lines, the electronic documents may be processed at any suitable time, such as when they are saved into the data repository, on a predetermined schedule (such processing new documents once a week), or at any other suitable time. The electronic documents may be processed to generate metadata on the objects within the electronic documents, and to save that metadata into the electronic documents. That way, an electronic copy of a physical document may be searched for using the metadata about the objects.

Specifically, the electronic documents may be processed as described in Steps 210 and 215. That is, tags are determined for all objects within the electronic document, and metadata is generated based on the object and the tag(s). The generated metadata is then saved into the electronic document. The metadata may be saved, for example, as an invisible text layer, or in any other suitable manner. By saving the metadata in a text form, whether visible or invisible to the user, the metadata is able to be searched using pre-existing text based searches. Alternatively, in one or more embodiments, the tags for an object may already exist within the electronic document (i.e., the document is in a native format). Metadata may then be generated using the pre-existing tags and saved into the electronic document.

In Step 205, a scan of a physical copy of a document with an object is received. The scan may be received in any format and at any resolution and/or size now known or later developed. The scan may be received by a program or application executing on the scanner itself, or on some other computing device.

In Step 210, a tag is determined for the object. The tag(s) define at least a portion of the object(s) and may be determined in any suitable manner. In one or more embodiments, templates may be compared to the object to determine if the object is similar to any known tagged objects. Alternatively, the tags may be determined based on a best guess algorithm, input from the user, or any other suitable method.

In Step 215, metadata is generated based on the object and the tag. The metadata includes composition information for the object and may be generated in any manner now known or later developed. The metadata may be based on the object and the tag(s). In one or more embodiments, the metadata may describe aspects of the object, such as object type, size, color, location, shape, etc.

In Step 220, the data repository is searched using the metadata. Specifically, a text based search is used with the search terms being some, or all, of the metadata. Additionally, the text based search may also include some text content from the document, such as text that has been recognized from OCR or other methods. Thus, the metadata of the physical copy is compared to the metadata of the electronic documents within the data repository, enabling electronic documents to be located even when there is little to no text in the document. The text-based search may be performed in any manner now known or later developed. In one or more embodiments, every document within the data repository may be searched. Alternatively, some subset of the electronic documents may be searched, such as a subset of the electronic documents to which the user is allowed to access (see Step 225).

In Step 225, a determination is made whether the user has permission to access the electronic document. Optionally, in one or more embodiments, Step 225 may be performed prior to, or concurrently with, Step 220. The permission(s) of the user may specify what electronic documents the user is allowed to view, edit, or otherwise access. The permission of the user may be determined by, for example, having the user enter in their username, password, or some other kind of identification, and then checking whether that user has permission to access the electronic document and/or portions of the data repository. If the user does not have permission to access the electronic document, the method ends. Alternatively, in one or more embodiments, if the user does not have permission to access the electronic document, some information about the document may be provided to the user, based on settings and/or permissions. For example, the user may be informed whether or not a match exists, or if there are multiple matches. Additionally, the needed level of clearance, or any other suitable information, may be provided. If the user does have permission to access the electronic document, the method proceeds to Step 230.

In Step 230, the located electronic document is provided to the user. The located electronic document may be provided to the user in any suitable manner. Specifically, a location of the electronic document may be provided in a link (such as a hyperlink), or by name via display on the scanner, an audio message, an e-mail, a printout, etc. Alternatively, a copy of the electronic document may be e-mailed to the user. It will be apparent to one of ordinary skill in the art, having the benefit of this disclosure, that there are many ways to provide the located electronic document to the user and, as such, the invention should not be limited to the above examples.

Figure 3:
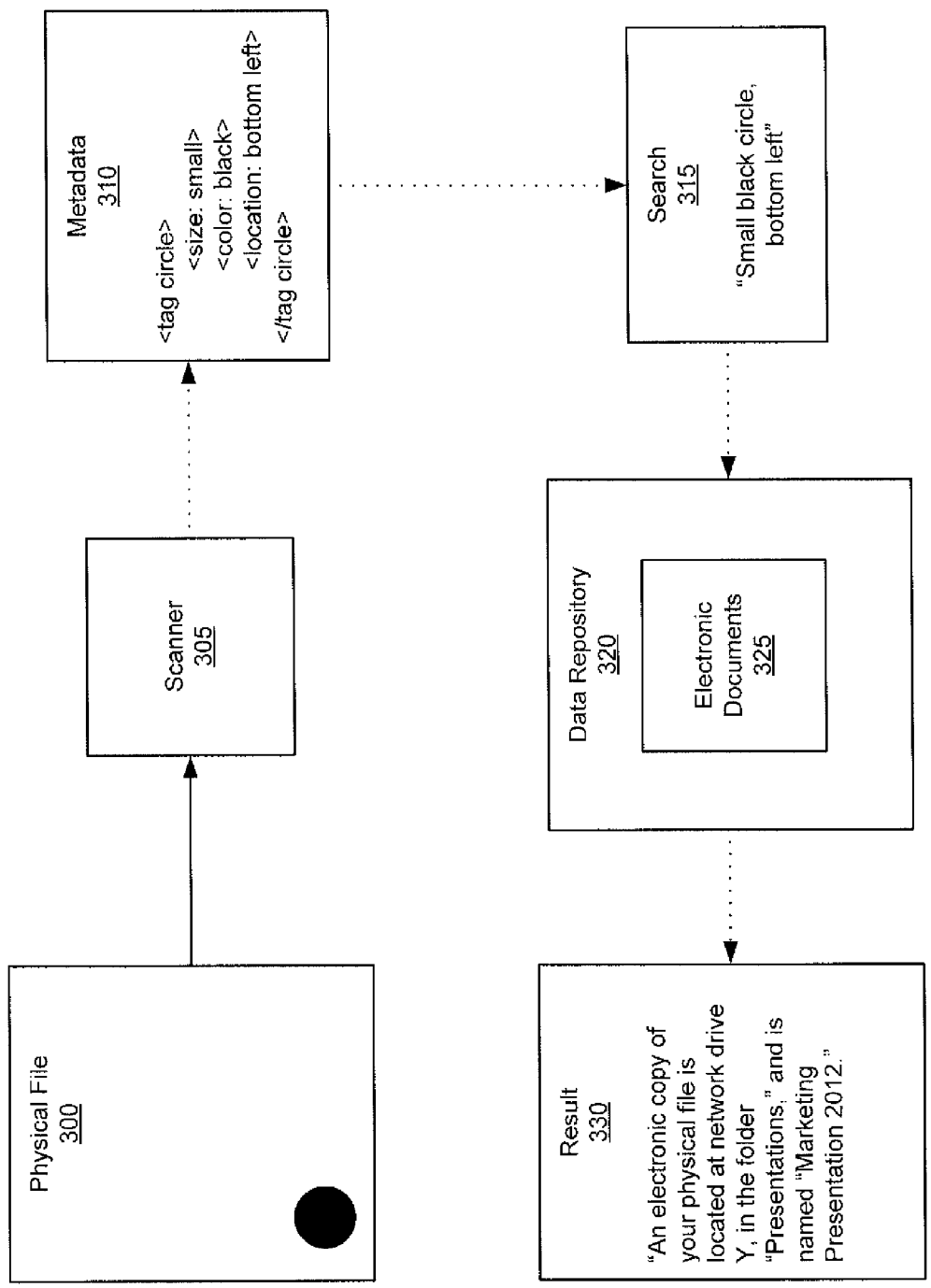
FIG. 3 shows an example in accordance with one or more embodiments of the invention.

FIG. 3 shows an example in accordance with one or more embodiments of the invention. The following example is for explanatory purposes only and not intended to limit the scope of the invention. Specifically, FIG. 3 shows an example of document discovery. In FIG. 3, a user possesses a physical copy (300), which is a printout of an electronic document. The physical copy (300) includes a small black circle in the bottom left hand corner of the document. When the user decides that he or she would like to locate the electronic copy of the document, the user places the physical copy (300) on scanner (305), and scans the document. The user may simply hit a button on the scanner, such as "Locate Original," to instruct the scanner to find an electronic copy of the physical copy (300).

Scanner (305) then processes the physical copy (300), and identifies that there is an object in physical copy (300)—the small black circle. The scanner (305) determines tags for the small black circle. After determining the tags for the small black circle, metadata (310) based on the object and the tags is generated. Specifically, the metadata (310) describes the object. Metadata (310) is shown as it may appear in an electronic file, and may be invisible to a user. The metadata that is generated in this example is: "circle, black, small, bottom left." The metadata and tags generated in this example may be based on rules set by any suitable entity, and may even be revised over time, such that a same object, when processed at a date after changes have been made to the rules for generating the metadata, may have different tags. Subsequently, search (315) is performed using the generated metadata. Search (315) shows that the search terms used are "small black circle, bottom left." Search (315) is performed in or on data repository (320), which includes a large amount of electronic documents (325). If the electronic documents (325) include a copy of physical copy (300), then the location of, or the document itself, will be returned in response to the search. The result (330) of search (315) is that "an electronic copy of your physical document is located at network drive Y, in the folder "Presentations," and is named "Marketing Presentation 2012." The user is then able to navigate to network drive Y on her computer, and access the electronic document for editing or other uses.

Optionally, the user in FIG. 3 may have been required to login or provide a password to scanner (305) when she hit the "Locate Original" button. This login and/or password is used to determine whether the user is allowed to access the electronic copy, and if she is not, the search will not return a result, even if the electronic copy is located.

One of ordinary skill in the art would appreciate that the present invention is not limited to implementation on a non-native hardcopy. One or more embodiments of the invention can also be implemented on non-native electronic documents. For example, consider a user who has a PDF copy of a document that was originally created in a different format. The PDF copy lacks the tags of the native document, preventing the user from easily editing the document, and the user may like to discover the original document to make some changes to the document. The PDF copy may be analyzed in a similar manner as a scan of a hardcopy would: tags for any objects are identified and metadata is generated. The metadata and optionally other standard text may then be used as search terms for a text-based search of a database of electronic documents. If a match or matches are found, the location(s) may be displayed and/or provided to the user in any suitable manner.

One of ordinary skill in the art would also appreciate that the present invention is not limited to the above examples. As another example, consider a native electronic file that does not have tagged objects, and would benefit from having the tags and/or metadata added. Some file types lack tags, such as JPEG and many others. Thus, if a native file was simply a JPEG image, and was subsequently printed, by performing the above steps on the JPEG a user may be able to locate the original JPEG file. In this example, the user could place a printout of the JPEG on the scanner, and successfully locate the original electronic JPEG document using a text based search with the metadata term(s), even though the original document was an image.

Figure 4:
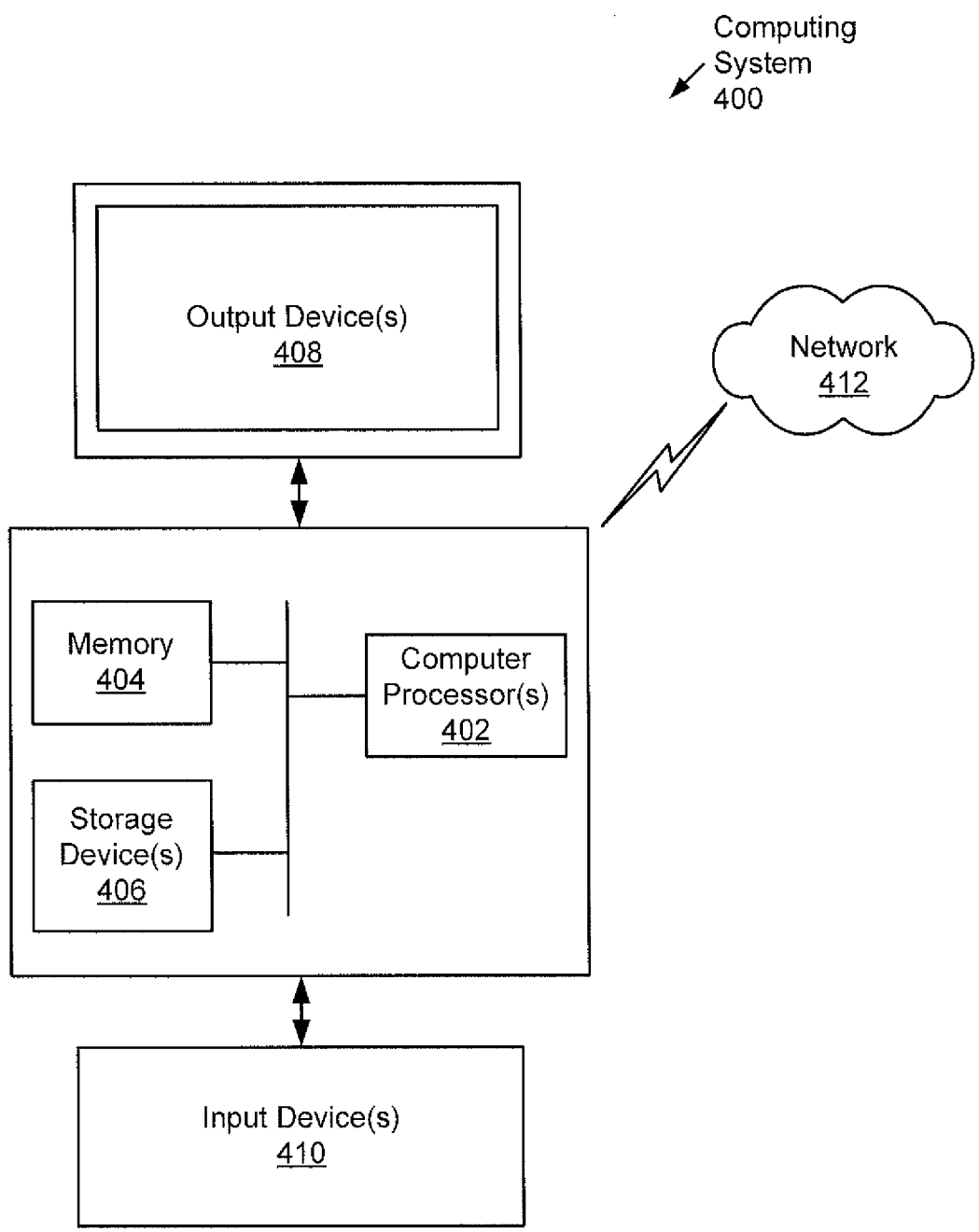
FIG. 4 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for document discovery, comprising:
   receiving a scan of a physical copy of a document comprising a non-text object;
   determining a first tag for the non-text object by comparing the non-text object with a plurality of templates comprising a plurality of tags, wherein the first tag defines a portion of the non-text object in an original file and specifies a type of the non-text object and a formatting attribute of the non-text object;
   generating, based on the first tag, non-text object metadata comprising composition information comprising the type and the formatting attribute for the non-text object;
   searching a plurality of electronic documents stored in a data repository with a search query comprising the non-text object metadata, wherein each of the plurality of electronic documents comprises searchable metadata;
   comparing the non-text object metadata with the searchable metadata; and
   providing a location of the original file to a user when the non-text object metadata in the search query matches the searchable metadata of the original file.

2. The method of claim 1, further comprising:
   processing an electronic document from the plurality of electronic documents stored in the data repository by:
   extracting a second tag for an object in the electronic document;
   generating the searchable metadata based on the second tag, wherein the searchable metadata of the electronic document describes the object; and
   storing the searchable metadata in the electronic document associated with the object.

3. The method of claim 1, wherein the original file is an Office Open XML file, and wherein the original file is one of the plurality of electronic documents stored in the data repository.

4. The method of claim 1, further comprising:
determining whether the user has authorization to access the original file, wherein the location is provided only when the user is determined to have authorization to access the original file.

5. The method of claim 1, wherein the location is provided in an e-mail to the user.

6. The method of claim 1, wherein the location is provided by displaying the location on a display of a scanner.

7. The method of claim 1, wherein the data repository is part of an enterprise content management (ECM) system.

8. The method of claim 1, wherein the searching further comprises using standard text discovered in the document through Optical Character Recognition (OCR).

9. A system for document discovery, comprising:
a data repository storing a plurality of electronic documents, wherein each of the plurality of electronic documents comprises searchable metadata;
a computer processor connected to the data repository that:
receives a scan of a physical copy of a document comprising a non-text object;
determines a first tag for the non-text object by comparing the non-text object with a plurality of templates comprising a plurality of tags, wherein the first tag defines a portion of the non-text object in an original file and specifies a type of the non-text object and a formatting attribute of the non-text object;
generates, based on the first tag, non-text object metadata comprising composition information comprising the type and the formatting attribute for the non-text object;
searches the plurality of electronic documents stored in the data repository with a search query comprising the non-text object metadata;
compares the non-text object metadata with the searchable metadata; and
provides a location of the original file to a user when the non-text object metadata in the search query matches the searchable metadata of the original file.

10. The system of claim 9, wherein the computer processor also:
processes an electronic document from the plurality of electronic documents stored in the data repository by:
extracting a second tag for an object in the electronic document;
generating the searchable metadata based on the second tag, wherein the searchable metadata of the electronic document describes the object; and
storing the searchable metadata in the electronic document associated with the object.

11. The system of claim 9, wherein the original file is an Office Open XML file, and wherein the original file is one of the plurality of electronic documents stored in the data repository.

12. The system of claim 9, wherein the computer processor also:
determines whether the user has authorization to access the original file, wherein the location is provided only when the user is determined to have authorization to access the original file.

13. The system of claim 9, wherein the location is provided in an e-mail to the user.

14. The system of claim 9, wherein the location is provided by displaying the location on a display of a scanner.

15. The system of claim 9, wherein the data repository is part of an enterprise content management (ECM) system.

16. The system of claim 9, wherein the searching further comprises using standard text discovered in the document through Optical Character Recognition (OCR).

17. A non-transitory computer readable medium comprising instructions for document discovery, the instructions, when executed, are configured to:
receive a scan of a physical copy of a document comprising a non-text object;
determine a first tag for the non-text object by comparing the non-text object with a plurality of templates comprising a plurality of tags, wherein the first tag defines a portion of the non-text object in an original file and specifies a type of the non-text object and a formatting attribute for the non-text object;
generate, based on the first tag, non-text object metadata comprising composition information comprising the type and formatting attribute for the non-text object;
search, using the non-text object metadata, a plurality of electronic documents stored in a data repository with a search query comprising the non-text object metadata, wherein each of the plurality of electronic documents comprises searchable metadata;
compare the non-text object metadata with the searchable metadata; and
provide a location of the original file to a user when the non-text object metadata in the search query matches the searchable metadata of the original file.

18. The non-transitory computer readable medium of claim 17, the instructions further configured to:
process an electronic document from the plurality of electronic documents stored in the data repository by:
extracting a second tag for an object in the electronic document;
generating the searchable metadata based on the second tag, wherein the searchable metadata of the electronic document describes the object; and
storing the searchable metadata in the electronic document associated with the object.

19. The non-transitory computer readable medium of claim 17, wherein the original file is an Office Open XML file, and wherein the original file is one of the plurality of electronic documents stored in the data repository.

20. The non-transitory computer readable medium of claim 17, the instructions further configured to:
determine whether the user has authorization to access the original file, wherein the location is provided only when the user is determined to have authorization to access the original file.

21. The non-transitory computer readable medium of claim 17, wherein the location is provided in an e-mail to the user.

22. The non-transitory computer readable medium of claim 17, wherein the location is provided by displaying the location on a display of a scanner.

23. The non-transitory computer readable medium of claim 17, wherein the data repository is part of an enterprise content management (ECM) system.

24. The non-transitory computer readable medium of claim 17, wherein the searching further comprises using standard text discovered in the document through Optical Character Recognition (OCR).

* * * * *